United States Patent
Vaglica et al.

(10) Patent No.: US 8,131,316 B2
(45) Date of Patent: *Mar. 6, 2012

(54) CELLULAR MODEM PROCESSING

(75) Inventors: John J. Vaglica, Austin, TX (US);
Christopher K. Y. Chun, Austin, TX (US); Jose G. Corleto-Mena, Austin, TX (US); Arnaldo R. Cruz, Austin, TX (US); Jianping Tao, Cedar Park, TX (US); Mieu V. Vu, Austin, TX (US); Mark E. Elledge, Austin, TX (US); Charbel Khawand, Miami, FL (US); Arthur M. Goldberg, Parkland, FL (US); David J. Hayes, Lake Worth, FL (US)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/606,044

(22) Filed: Oct. 26, 2009

(65) Prior Publication Data

US 2010/0113003 A1     May 6, 2010

Related U.S. Application Data

(63) Continuation of application No. 10/682,746, filed on Oct. 9, 2003, now Pat. No. 7,623,894.

(51) Int. Cl.
*H04M 1/00* (2006.01)
*H04B 1/38* (2006.01)
(52) U.S. Cl. .......... 455/557; 455/84; 455/418; 455/419; 455/556.1; 370/347

(58) Field of Classification Search ........... 370/252, 370/347, 351–356, 335, 493–495, 329, 337, 370/348; 711/170, 173; 455/557, 84, 418, 455/419, 556.2, 420, 414.1, 403, 407, 422.1, 455/425, 73, 456.6, 550.1, 333, 552.1, 556.1
See application file for complete search history.

(56) References Cited

U.S. PATENT DOCUMENTS

| | | | |
|---|---|---|---|
| 5,408,661 A | 4/1995 | Kuranaga | |
| 5,613,077 A | 3/1997 | Leung et al. | |
| 5,826,111 A | 10/1998 | Caudel et al. | |
| 5,864,710 A | 1/1999 | Sands et al. | |
| 5,946,634 A | 8/1999 | Korpela | |

(Continued)

FOREIGN PATENT DOCUMENTS

EP     0852448 A1     2/1997

(Continued)

OTHER PUBLICATIONS

Francis, "ARM DSP—Enhanced Extensions", ARM White Paper, 2001, pp. 1-7.

*Primary Examiner* — Pablo N Tran
(74) *Attorney, Agent, or Firm* — David G. Dolezal

(57) ABSTRACT

A cellular mobile station including a modem processor and memory. The memory includes instructions for the modem processor to perform layer 1 processor operations, layer 2 processor operations, and layer 3 processor operations. The modem processor executes the instructions to perform processor operations for the cellular mobile station to communication data as per a cellular communications protocol. In one example, the mobile station includes different levels of memory to provide different deterministic access times.

20 Claims, 2 Drawing Sheets

U.S. PATENT DOCUMENTS

| | | | |
|---|---|---|---|
| 6,052,565 | A | 4/2000 | Ishikura et al. |
| 6,070,188 | A | 5/2000 | Grant et al. |
| 6,115,763 | A | 9/2000 | Douskey et al. |
| 6,185,628 | B1 | 2/2001 | Sands et al. |
| 6,222,827 | B1 | 4/2001 | Grant et al. |
| 6,301,687 | B1 | 10/2001 | Jain et al. |
| 6,351,797 | B1 | 2/2002 | Beard, Sr. et al. |
| 6,353,596 | B1 | 3/2002 | Grossglauser et al. |
| 6,353,857 | B2 | 3/2002 | Bader et al. |
| 6,470,304 | B1 | 10/2002 | Mali et al. |
| 6,490,271 | B1 | 12/2002 | Erjanne |
| 6,550,020 | B1 | 4/2003 | Floyd et al. |
| 6,788,953 | B1 | 9/2004 | Cheah et al. |
| 6,795,425 | B1 | 9/2004 | Raith |
| 6,812,870 | B1 | 11/2004 | Kryzak et al. |
| 6,829,667 | B2 | 12/2004 | Nagalkar |
| 6,914,913 | B2 | 7/2005 | Sheynman et al. |
| 6,930,983 | B2 | 8/2005 | Perkins et al. |
| 6,931,569 | B2 | 8/2005 | Fong et al. |
| 6,952,411 | B2 | 10/2005 | Sinnarajah et al. |
| 6,988,167 | B2 | 1/2006 | Allen et al. |
| 7,330,908 | B2 | 2/2008 | Jungck |
| 7,388,841 | B2 * | 6/2008 | Shao et al. ............... 370/238 |
| 7,447,735 | B2 | 11/2008 | Khawand et al. |
| 7,568,041 | B1 * | 7/2009 | Turner et al. ............... 709/231 |
| 7,738,582 | B2 * | 6/2010 | Simon ............... 375/265 |
| 2002/0010817 | A1 | 1/2002 | Yeh |
| 2003/0144029 | A1 | 7/2003 | Wu et al. |
| 2004/0116120 | A1 | 6/2004 | Gallagher et al. |
| 2005/0041510 | A1 | 2/2005 | Khawand et al. |
| 2005/0254428 | A1 * | 11/2005 | Perkins et al. ............... 370/235 |

FOREIGN PATENT DOCUMENTS

| | | |
|---|---|---|
| EP | 0740253 B1 | 7/2002 |
| WO | 9635286 A1 | 11/1996 |
| WO | 9844425 A1 | 10/1998 |
| WO | 0196979 A2 | 12/2001 |

* cited by examiner

CELLULAR MODEM PROCESSING

BACKGROUND OF THE INVENTION

1. Field of the Invention

This invention relates in general to a cellular mobile station and in particular to cellular modem processing in a cellular mobile station.

2. Description of the Related Art

Cellular mobile stations such as e.g. cellular phones and wireless PDA's typically include modem circuitry for performing modem operations for cellular communications. These operations typically are classified by communications protocol layers. Examples of communication protocol layers include a physical layer, a data layer, and layers above the data layer such as (with the Open Systems Interconnect (OSI) model) a network layer, a transportation layer, a session layer, a presentation layer, and an application layer.

Cellular mobile stations typically perform the modem operations of these different layers with multiple processors. For example, one processor may perform modem operations of the physical layer and/or data layer and another processor may perform modem operations of higher layers. In one example, a cellular mobile station uses a digital signal processor for the physical layer operations and a microcontroller unit processor for the higher layer operations.

What is desired is an improved cellular mobile station.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates identical items unless otherwise noted.

DETAILED DESCRIPTION

The following sets forth a detailed description of a mode for carrying out the invention. The description is intended to be illustrative of the invention and should not be taken to be limiting.

Figure 1:
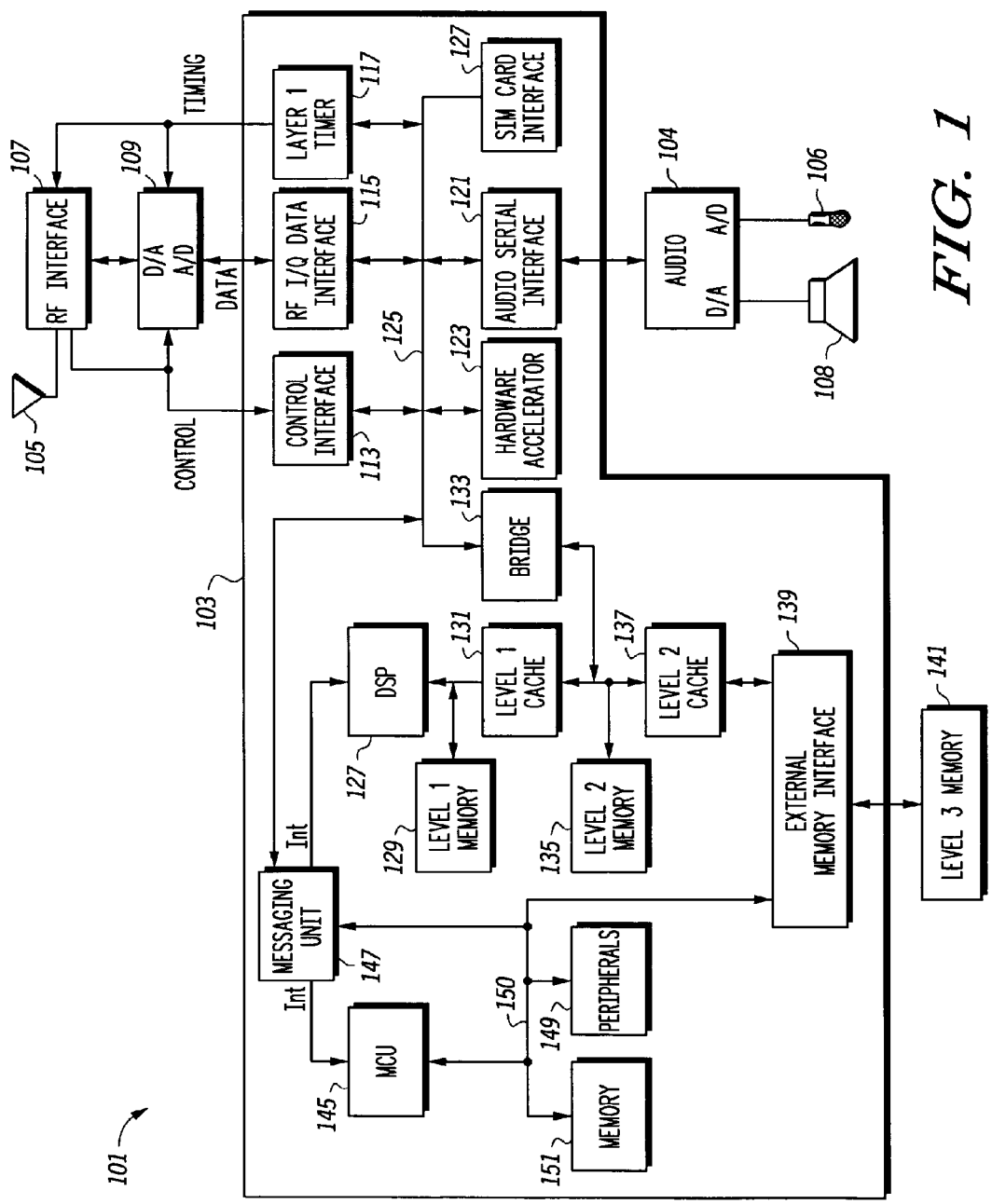
FIG. 1 is a block diagram of one embodiment of a cellular mobile station according to the present invention.

FIG. 1 is a block diagram of a cellular mobile station according to the present invention. Mobile station 101 may be e.g. any one of a cellular phone, wireless PDA, or wireless modem. Mobile station 101 includes an antenna 105 for transmitting and receiving wireless signals as per a cellular communications protocol. Antenna 105 is coupled to RF interface 107 which is coupled to analog to digital (A/D) and digital to analog (D/A) circuitry 109. In the embodiment of FIG. 1, mobile station 101 includes an integrated circuit 103 having both a microcontroller unit (MCU) processor 145 and a digital signal processor (DSP) 127. In the embodiment shown, MCU processor 145 is utilized to perform applications of the mobile station 101 such as e.g. games, video, and word processing applications.

DSP 127 is utilized in mobile station 101 as a cellular modem processor. DSP 127 is utilized to perform modem operations that enable station 101 to communicate encoded data (e.g. voice and/or information) over a cellular phone network as per a cellular communications protocol. As will be explained later, DSP 127 can perform processor modem operations of layer 1 (physical layer), layer 2 (data layer), and layer 3 of a cellular communication protocol (See FIG. 2).

Cellular mobile station 101 includes a control interface 113, an RF I/Q data interface 115, and a layer 1 (L1) timer 117 coupled to DSP bus 125, circuitry 109, and RF interface 107. In the embodiment shown, integrated circuit 103 also includes hardware accelerators 123, audio serial interface 121, and a subscriber identification module (SIM) card interface 127 coupled to DSP bus 125. Mobile station 101 includes audio circuitry 104, speaker 108, and microphone 106 for providing audio input and output to mobile station 101. In other embodiments, at least some of audio circuitry 104 may be implemented in integrated circuit 103.

In the embodiment of FIG. 1, DSP 127 is operably coupled to DSP bus 125 via level 1 cache 131 and bridge 133. Integrated circuit 103 also includes a level 1 memory 129, a level 2 memory 135, a level 2 cache 137, and an external memory interface 139. Level 1 memory 129 and level 2 memory 135 may include non volatile and/or volatile memory.

In one embodiment, data is encoded by DSP 127 as per a cellular communications protocol and provided via bridge 133, DSP bus 125, RF I/Q data interface 115, and circuitry 109 to RF interface 107 to be transmitted over antenna 105. Encoded data is received by DSP 127 from antenna 105 via RF interface 107, circuitry 109, RF I/Q data interface 115, bus 125, and bridge 133. Layer 1 timer 117 and control interface 113 provide the requisite timing and control information for the data to be communicated according to the cellular communications protocol.

In the embodiment of FIG. 1, integrated circuit 103 includes MCU processor 145. MCU processor 145 is coupled to memory 151, peripherals 149, and external memory interface 139. MCU processor 145 and DSP 127 are each coupled to messaging unit 147 for exchanging messages there between. MCU processor 145 and DSP 127 also can exchange data in shared level 3 memory 141. In some embodiments, memory 141 may be located in integrated circuit 103.

In some embodiments, integrated circuit 103 includes security features for DSP 127. For example, in one embodiment, integrated circuit 103 includes a hardware accelerator (e.g. 123) which generates a digital signature for a section of DSP 127 instructions for authentication. In another embodiments, integrated circuit 103 includes a hardware accelerator (e.g. 123) that encrypts and decrypts key variables and stores them in a volatile memory of the hardware accelerator. These security features protect the operation of DSP 127 from malicious instructions which could interfere with normal modem operation.

Information to be transmitted as per cellular communications protocol may be provided to DSP 127 from MCU processor 145 for transmission. Furthermore, information received as per a cellular communication protocol may be provided from DSP 127 to MCU processor 145. In one embodiment, the information to be transmitted and the information received may be exchanged between DSP 127 and MCU processor 145 by one of the processors writing the information to a portion of shared memory 141 and the other processor accessing the information from the shared memory. A pointer may be exchanged between processors that points to the shared memory location of the data. In one embodiment, station 101 implements an interprocessor communication protocol for managing the communications between processor 145 and DSP 127. The use and management of a shared memory is abstracted by the interprocessor communication protocol. Examples of interprocessor communication protocols may be found in U.S. patent application Ser. No. 10/610, 746, entitled "An Interprocessor Communication Protocol," filed Jul. 1, 2003 and U.S. patent application Ser. No. 10/643, 327, entitled "Method and Apparatus for Providing Interprocessor Communications Using Shared Memory," filed Aug. 19, 2003, both of which are hereby incorporated by reference in their entirety.

In some embodiments, other types of processors may be utilized in place of DSP 127. Also in other embodiments, mobile station 101 may have other configurations. For example, other embodiments may not include SIM card 121 or hardware accelerators 123. Still in other embodiments, MCU processor 145 and DSP 127 may be implemented on separate integrated circuits. Still further in other embodiments, a mobile station may only include a DSP and no MCU processor.

Figure 2:
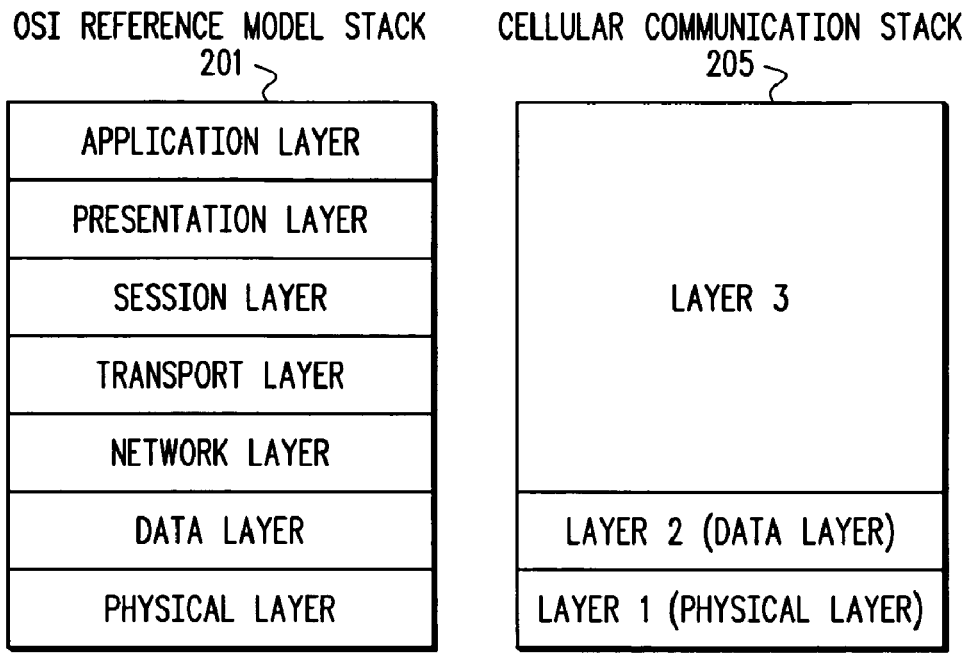
FIG. 2 is a view of a communication protocol stack.

FIG. 2 shows a stack 205 of cellular communication protocol layers and how they correspond to OSI reference model stack 201. Operations of a cellular communication protocol layer are operations for performing the functions designated to the layer. Layer 1 of stack 205 corresponds to the physical layer of the OSI model. Layer 1 operations may include (depending upon the particular cellular communications protocol) modulation operations, demodulation operations, interleaving operations, deinterleaving operations, channel encoding operations, channel decoding operations, channel equalization operations, synchronization operations, automatic gain control operations, and automatic frequency control operations.

Modulation operations include operations to place encoded channel data into a carrier signal for transmission. These operations may change either the amplitude, frequency, or phase of a carrier signal wave in a way that represents the original signals. Some examples of digital modulation techniques that may be implemented by station 101 include: ASK (Amplitude Shift Keying), FSK (Frequency Shift Keying), Gaussian-filtered Minimum Shift Keying (GMSK), QPSK (Quadrature Phase Shift Keying) and QAM (Quadrature Amplitude Modulation).

Demodulation operations include operations to recover the encoded channel data from a carrier which has been used to transmit the signal over a transmission medium. Demodulation operations may include operations for the coherent detection of the received signal to accurately estimate the channel phase and attenuation to allow for separation of the transmitted signal from the carrier.

Interleaving operations include operations utilized to scramble the order of data symbols to be transmitted over a channel in such a way that, when they are descrambled (at the receiver), any burst of channel errors will be spread out in time and thus appear as random errors to the decoder.

Deinterleaving operations include operations utilized to unscramble the symbols that were scrambled by the interleaving operations. Deinterleaving is performed on the received symbols, prior to channel decoding.

Channel encoding operations include operations for adding redundant data into a transmitted bit stream before transmission, in order to protect the bit stream from errors that may occur. An example of one encoding technique that may be implemented by station 101 is convolutional encoding.

Channel decoding operations include operations for inverting the channel encoding process and for attempting to identify and correct any transmission errors. In one embodiment, a Viterbi algorithm may be used to decode convolutional codes.

Equalization operations include operations used to extract the desired signal from the unwanted reflections. Equalization operations maybe used to find out how a known transmitted signal is modified by multi-path fading, and constructing an inverse filter to extract the rest of the desired signal.

Synchronization operations include operations used to bring two signals or the wideband components of two signals into time alignment. For example, a Delay Locked Loop (DLL) may be used to bring two signals into closer alignment and keep them aligned.

Automatic gain control (AGC) operations include operations used to automatically adjust the gain in a specified manner as a function of a specified parameter, such as received signal level.

Automatic frequency control (AFC) operations include operations utilized to maintain the frequency of a receiver's reference oscillator within the specified limits with respect to a reference frequency such as the base station transmitter.

Layer 2 corresponds to the data layer of OSI model stack 201. Examples of layer 2 operations may include (depending upon the particular cellular communications protocol) medium access control (e.g. multiple access control) operations and logical link control (e.g. link access control) operations.

Medium Access Control operations include operations related to the management of the shared transmission resources, such as multiplexing of the packet data physical channels and the radio link connections associated with the packet data physical channels.

Logical Link Control operations include operations associated with the sequence and validity of data packets. Logical Link Control operations are utilized, for example, for maintaining sequence order of frames across one or more connections; for the detection of transmission, format, and operational errors on a logical link connection; for recovery from detected transmission, format, and operational errors; and for notification to upper layers of the stack of unrecoverable errors.

Layer 3 of stack 205 corresponds to any or all (depending upon the particular cellular communications protocol) of the network layer, the transportation layer, the session layer, the presentation layer and the application layer of OSI model stack 201. Examples of layer 3 operations may include (depending upon the particular cellular communications protocol) call control (CC) management operations, mobility management (MM) operations, subnet convergence protocol (SNDCP) operations, and radio resource (RR) management operations.

Call Control (CC) management operations include operations to manage call routing, call establishment, call maintenance, and call release functions. These operations may be analogous to ISDN call control operations.

Mobility Management (MM) operations include operations to support the mobility of user terminals, such as informing the network of the mobile station present location and providing user identity authentication and confidentiality.

Sub Network Dependent Convergence Protocol (SNDCP) operations include operations used in a number of different technologies. These operations may be used to provide services to the higher layers which may include connectionless and connection-oriented modes, compression, multiplexing, and segmentation.

Radio Resource (RR) management operations include operations to establish, maintain, and release radio resource connections that allow a point-to-point dialogue between the network and a mobile station. Examples of radio resource management operations include call processing operations, radio channel control operations, mobile station control operations, call setup operations, call handoff operations, power control operations, and mobile station lockout operations.

In one embodiment, mobile station 101 is configured to communicate over a cellular communications network as per the Global System for Mobile communications (GSM). In other embodiments, mobile station 101 may be configured to communicate as per other cellular communications protocols such as the code division multiple access (CDMA) protocol, the Universal Mobile Telephone Service (UMTS) wide band CDMA (W-CDMA) protocol, the CDMA2000 protocol, the Time Division-Synchronous Code Division Multiple Access technology (TD-SCDMA) protocol, the Time Division Multiple Access (TDMA) protocol, the Integrated Digital Enhanced Network (iDEN) protocol, the Terrestrial Trunked Radio (TETRA) protocol, the General Packet Radio Services (GPRS) protocol, the Enhanced Data Rate for GSM Evolution (EDGE) protocol, the iDEN protocol, and the WiDEN protocol. Operations of each layer of stack 205 may vary with each of the different protocols.

Figure 3:
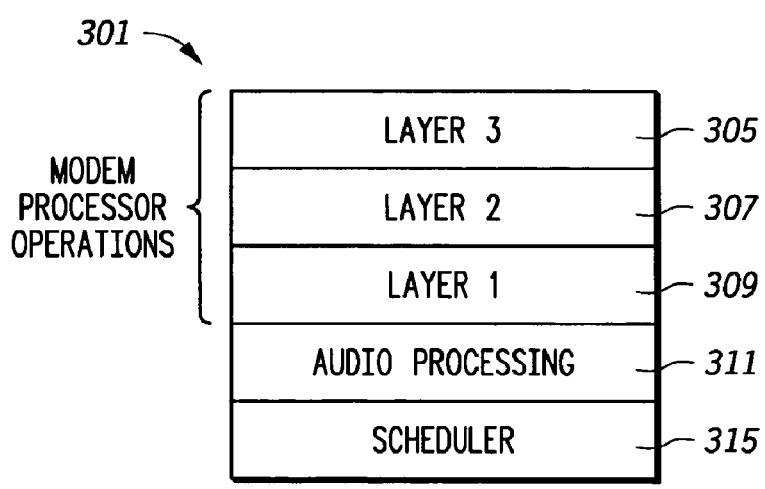
FIG. 3 shows one embodiment of a cellular modem instruction partitioning according to the present invention.

FIG. 3 shows one embodiment of a partitioning of program instructions for execution by DSP 127 for performing processor operations. In one embodiment, the instructions whose partitioning is represented by block 301 are stored in a non volatile memory located on integrated circuit 103 (e.g. level 1 memory 129 and/or level 2 memory 135) and/or in off chip (level 3) memory 141. In some embodiments, at least some of the instructions are stored in a compressed format in a non volatile memory, wherein the instructions are decompressed and stored in volatile memory for execution by DSP 127. In one embodiment, some instructions are stored in memory 129 and others are stored in memory 135.

In yet another embodiment, at least some of the DSP 127 instructions are stored in memory 151 (in compressed or uncompressed format). MCU processor 145 transfers the instructions from memory 151 to DSP 127 through either the messaging unit 147 or level 3 memory 141 during system initialization. Upon receipt, DSP 127 validates the authenticity of the memory contents and places the instructions in a memory (level 1 memory 129, level 2 memory 135, and/or level 3 memory 141).

In some embodiments, the instructions represented by block 301 are executed from a non volatile memory. In other embodiments, the instructions are executed from volatile memory. The instructions represented by block 301 are implemented using the instruction set for DSP 127.

Block 301 represents instructions for performing modem processor operations. Modem processor operations are operations performed by a processor of a mobile station to facilitate communication as per a cellular communications protocol. Layer 3 instructions 305 are instructions for performing layer 3 processor operations. Layer 3 processor operations are processor operations performed by a processor of a mobile station to facilitate layer 3 operations of a cellular communications protocol. Examples of Layer 3 processor operations may include (depending upon the particular cellular communications protocol) call control (CC) management processor operations, mobility management (MM) processor operations, subnet convergence protocol (SNDCP) processor operations, and radio resource (RR) management processor operations.

Layer 2 instructions 307 are instructions for performing layer 2 processor operations. Layer 2 processor operations are processor operations performed by a processor of a mobile station to facilitate layer 2 operations of a cellular communications protocol. Examples of layer 2 processor operations may include (depending upon the particular cellular communications protocol) medium access control processor operations and logical link control processor operations.

Layer 1 instructions 309 are instructions for performing layer 1 processor operations. Layer 1 processor operations are operations performed by a processor of the mobile station to facilitate layer 1 operations of a cellular communications protocol. Examples of layer 1 processor operations may include modulation processor operations, demodulation processor operations, interleaving processor operations, deinterleaving processor operations, channel encoding processor operations, channel decoding processor operations, channel equalization processor operations, synchronization processor operations, automatic gain control processor operations, and automatic frequency control processor operations.

Block 301 also includes instructions 311 for performing audio processing processor operations and instructions 315 for performing scheduler processor operations. Some of these operations may be unrelated to operations of a cellular communications protocol.

In one embodiment, instructions for DSP 127 to perform all of the layer 3, layer 2, and layer 1 processor operations for mobile station 101 are stored in a memory (129, 135, and/or 141) of mobile station 101. For example, instructions for DSP 127 to perform all of the processor operations for the modem operations described above with respect to a particular cellular communications protocol (e.g. GSM) are stored in a memory of mobile station 101. In another embodiment, instructions for DSP 127 to perform all layer 2 processor operations and layer 1 processor operations and some of the layer 3 processor operations of a particular cellular communications protocol are stored a memory of mobile station 101. Accordingly, DSP 127 executes those instructions to perform the processor operations for mobile station 101 to communicate as per the particular cellular communications protocol.

Performing all or substantially all modem processor operations by a single processor may reduce system cost in that only a single processor may perform modem processor operations and may reduce system complexity in that only one processor instruction set may be utilized for modem functionality. Further, using one processor to perform all or substantially all of the modem processor operations may reduce or eliminate the amount of messaging between processors of a mobile station due to modem operations. Furthermore, such a configuration may save power in that only one processor needs to be operable during modem operation. For example, if only a cellular phone function of mobile station 101 is being utilized, MCU processor 145 may be placed in a low power mode in that the modem processor operations needed for the cellular phone function are performed by DSP 127.

Furthermore, a mobile station where all or substantially all of the modem processor operations are performed by DSP 127 may allow for increased security in that "untrusted" applications running on MCU processor 145 would not have access to modem processor operations performed by DSP 127. With such an embodiment, a cellular network may be protected while allowing untrusted applications to be run on MCU processor 145. In some embodiments, untrusted applications may include applications which have not been validated to be nonmalicious.

In one embodiment, level 3 memory 141 is shared between MCU processor 145 and DSP 127. To protect cellular modem processor instructions from corruption by malicious instructions running on MCU processor 145, level 3 memory is subdivided into at least two regions. The first region is accessible only by DSP 127 and is used for holding instructions and data related to modem processor operations. This region is inaccessible by the MCU processor 145, and is therefore secure from malicious instructions being executed by it. The second region is shared between the DSP 127 and MCU processor 145. Data and commands are passed between the processors in this region of the level 3 memory 141. Since both processors have access to this region, instructions and data critical to the cellular modem operations are not stored in this region. In other embodiments, other memory regions of mobile station 101 could be defined with other access protections or restrictions depending on security requirements.

Referring back to FIG. 1, mobile station 101 includes multiple hierarchal levels of memory with each level having a different manufacturing cost and access time. In one embodiment, level 1 memory 129 may include volatile and/or non volatile memory having a relatively fast deterministic access time, but at typically a relatively higher cost. In one embodiment, level 1 memory contains instructions and/or data for performing modem processor operations requiring fast deterministic access according to a cellular communications protocol. Level 1 cache 131 is utilized to decrease the average access time to instructions and data stored in level 2 memory 135 and level 3 memory 141.

In one embodiment, level 2 memory 135 may include volatile and/or non volatile memory having a relatively slower deterministic access time (compared to level 1 memory), but at typically a relatively lower cost. In one embodiment, level 2 memory 135 contains instructions and/or data for performing modem processor operations having determinism and access time requirements that are less restrictive than those whose instructions and/or data are stored in level 1 memory 129. Level 2 cache 137 is utilized to decrease the average access time to level 3 memory 141.

In one embodiment, level 3 memory 141 may include volatile and/or non volatile memory having relatively the slowest deterministic access time (compared to level 1 and level 2 memory), but at typically the lowest cost. In one embodiment, level 3 memory 141 contains instructions and/or data for performing modem processor operations having the least restrictive determinism and access time requirements.

In other embodiments, mobile stations may have other memory configurations. In some embodiments, some modem operations (e.g. layer 1 operations or layer 2 operations) may be performed by hardware accelerator 123. In addition, some layer 3 processor operations may be performed by MCU processor 145. In other embodiments, the memories of a mobile station may contain instructions for DSP 127 to perform modem processor operations for more than one cellular communications protocol. In other embodiments, other types of processors (e.g. MCU processors) may be utilized to perform the modem processor operations. Furthermore, mobile stations of other embodiments may have other configurations.

In another embodiments, DSP 127 can perform multimedia acceleration functions such as decompressing or compressing music or video information. DSP 127 can access multimedia information in shared memory 141 written by MCU processor 145. In other embodiments, the DSP 127 can process information written to memory 141 by a direct memory access (DMA) (not shown) coupled to MCU bus 150. The processing of multimedia information may include compressing information received from a camera (not shown) or microphone (e.g. 106 which in some embodiments is also coupled to MCU bus 150). The compressed information can be stored by DSP 127 into shared memory 141 and accessed by MCU processor 145.

In one embodiment, a cellular mobile station includes communication interface circuitry and a cellular modem processor operably coupled to the communication interface circuitry. The cellular modem processor executes instructions from an instruction set. The cellular mobile station further includes at least one memory coupled to the cellular modem processor. The at least one memory stores instructions. The instructions include instructions that when executed by the cellular modem processor perform a layer 1 processor operation of a cellular communication protocol by the cellular modem processor, instructions that when executed by the cellular modem processor perform a layer 2 processor operation of the cellular communication protocol by the cellular modem processor, and instructions that when executed by the cellular modem processor perform a layer 3 processor operation of the cellular communication protocol by the cellular modem processor.

In another embodiment, a method of performing cellular modem operations includes performing a layer 1 processor operation in accordance with a cellular communication protocol by a cellular modem processor, performing a layer 2 processor operation in accordance with the cellular communication protocol by the cellular modem processor, and performing a layer 3 processor operation in accordance with the cellular communication protocol by the cellular modem processor.

In another embodiment, a method of operating a cellular mobile station includes communicating data as per a cellular communications protocol, storing instructions in at least one memory, and performing a layer 1 processor operation in accordance with the cellular communications protocol by a cellular modem processor. The method also includes performing a layer 2 processor operation in accordance with the cellular communications protocol by the cellular modem processor and performing a layer 3 processor operation in accordance with the cellular communications protocol by the cellular modem processor.

While particular embodiments of the present invention have been shown and described, it will be recognized to those skilled in the art that, based upon the teachings herein, that further changes and modifications may be made without departing from this invention and its broader aspects, and thus, the appended claims are to encompass within their scope all such changes and modifications as are within the true spirit and scope of this invention.

What is claimed is:

1. An integrated circuit for a cellular mobile station, the cellular mobile station communicating as per a cellular communication protocol, the integrated circuit comprising:
   a cellular modem processor, the cellular modem processor to execute instructions to perform layer 1 processor operations of the cellular communication protocol, instructions to perform a layer 2 processor operation of the cellular communication protocol, and instructions to perform a layer 3 processor operation of the cellular communication protocol when the integrated circuit is operational; and
   wherein the layer 1 processor operations include a modulation processor operation, a demodulation processor operation, an interleaving processor operation, a deinterleaving processor operation, a channel encoding processor operation, a channel decoding processor operation, a channel equalization processor operation, a synchronization processor operation, an automatic gain control processor operation, and an automatic frequency control processor operation;
   wherein the layer 3 processor operation includes one of the group consisting of: a call control (CC) management processor operation, a mobility management (MM) processor operation, a subnet convergence protocol (SNDCP) processor operation, and a radio resource (RR) management processor operation;
a second processor;
at least one memory.

2. The integrated circuit of claim 1 wherein the layer 2 processor operation is one of a medium access control processor operation and a logical link control processor operation.

3. The integrated circuit of claim 1 wherein the second processor executes application instructions and does not perform modem processor operations.

4. The integrated circuit of claim 1 wherein the cellular modem processor to performs all layer 1 processor operations and all layer 2 processor operations performed by the integrated circuit.

5. A method of performing processor operations comprising:
performing a plurality of layer 1 processor operations in accordance with a cellular communication protocol by a cellular modem processor, wherein the performing the layer 1 operations includes:
performing a modulation processor operation by the cellular modem processor;
performing a demodulation processor operation by the cellular modem processor;
performing an interleaving processor operation by the cellular modem processor;
performing a deinterleaving processor operation by the cellular modem processor;
performing a channel encoding processor operation by the cellular modem processor;
performing a channel decoding processor operation by the cellular modem processor;
performing a layer 2 processor operation in accordance with the cellular communication protocol by the cellular modem processor; and
performing a layer 3 processor operation in accordance with the cellular communication protocol by the cellular modem processor, wherein the performing the layer 3 operations includes performing an operation of the group consisting of:
performing a call control (CC) management processor operation by the cellular modem processor;
performing a mobility management (MM) processor operation by the cellular modem processor;
performing a radio resource (RR) management processor operation by the cellular modem processor;
performing processor operations by a second processor located on the same integrated circuit as the cellular modem processor.

6. The method of claim 5 wherein the layer 2 processor operation is one of a medium access control processor operation and a logical link control processor operation.

7. The method of claim 5 the performing the plurality of layer 3 processor operation performing a subnet convergence protocol (SNDCP) processor operation by the cellular modem processor.

8. The method of claim 5 wherein the demodulation operation includes an operation to recover the encoded channel data from a carrier which has been used to transmit the signal over a transmission medium.

9. The method of claim 5 wherein the interleaving operation includes an operation utilized to scramble the order of data symbols to be transmitted over a channel in such a way that, when descrambled, any burst of channel errors will be spread out in time and thus appear as random errors to the decoder.

10. The method of claim 5 wherein the deinterleaving operations include operations utilized to unscramble symbols that were scrambled by a interleaving operation.

11. The method of claim 5 wherein the channel encoding operation includes an operation for adding redundant data into a transmitted bit stream before transmission, in order to protect the bit stream from errors.

12. The method of claim 5 wherein the channel decoding operation includes an operation for inverting a channel encoding process and for attempting to identify and correct transmission errors.

13. The method of claim 5 further comprises:
performing a channel equalization processor operation by the cellular modem processor;
performing a synchronization processor operation by the cellular modem processor;
performing an automatic gain control processor operation by the cellular modem processor; and
performing an automatic frequency control processor operation by the cellular modem processor.

14. The method of claim 13 wherein the equalization operation includes an operation used to extract the desired signal from unwanted reflections.

15. The method of claim 13 wherein the synchronization operation includes an operation used to bring two signals or the wideband components of two signals into time alignment.

16. The method of claim 13 wherein the automatic gain control operation includes an operation used to automatically adjust the gain in a specified manner as a function of a specified parameter.

17. The method of claim 5 wherein the Call Control management operation includes an operation to manage call routing, call establishment, call maintenance, or a call release function.

18. The method of claim 5 wherein the Mobility Management operation includes an operation to support the mobility of user terminals.

19. The method of claim 5 wherein the Radio Resource management operation includes an operation to establish, maintain, or a release radio resource connections that allows a point-to-point dialogue between the network and a mobile station.

20. A method of performing processor operations comprising:
performing a plurality of layer 1 processor operations in accordance with a cellular communication protocol by a cellular modem processor;
performing a layer 2 processor operation in accordance with the cellular communication protocol by the cellular modem processor; and
performing a plurality of layer 3 processor operations in accordance with the cellular communication protocol by the cellular modem processor;
performing processor operations by a second processor located on the same integrated circuit as the cellular modem processor.

* * * * *